July 9, 1957 G. J. NOWOTNY 2,798,895
POINT CONTACT BATTERY
Filed June 18, 1954 4 Sheets-Sheet 1
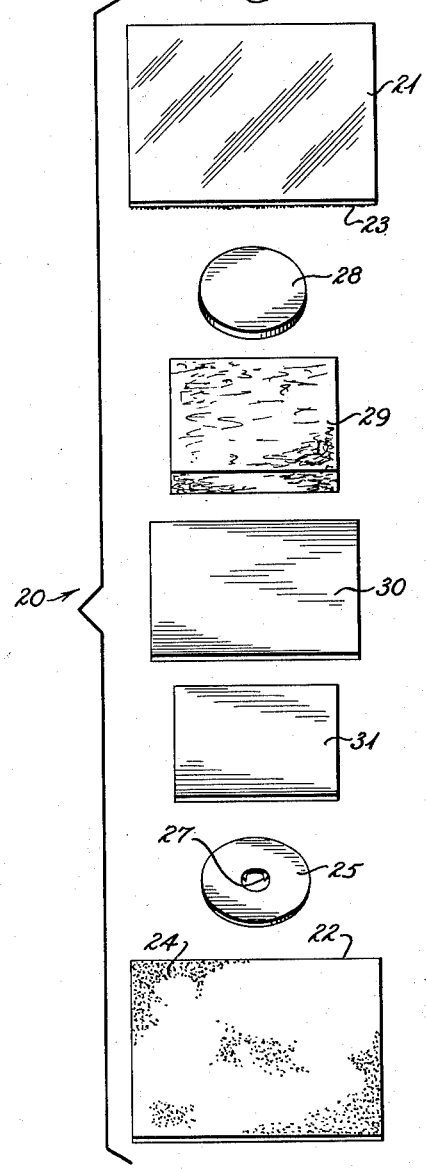
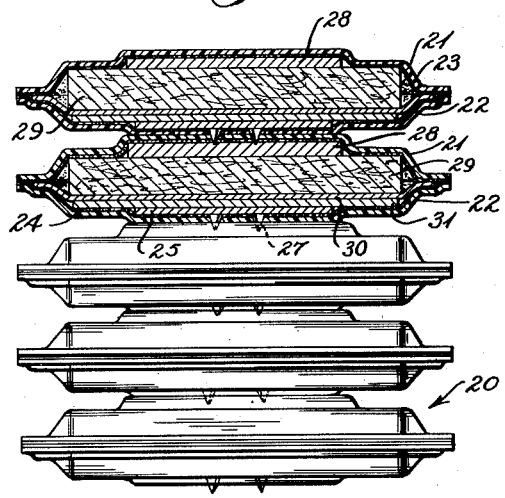
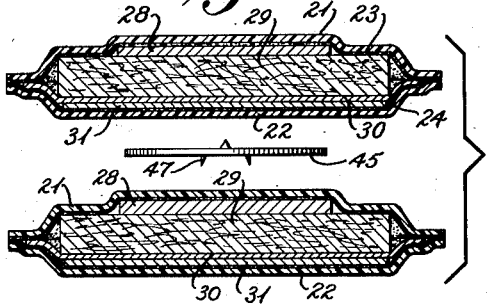
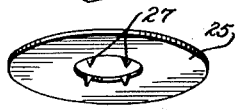
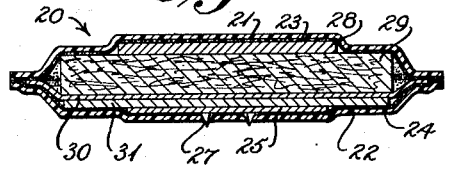
INVENTOR
Glenn J. Nowotny
BY Beale & Jones
ATTORNEYS

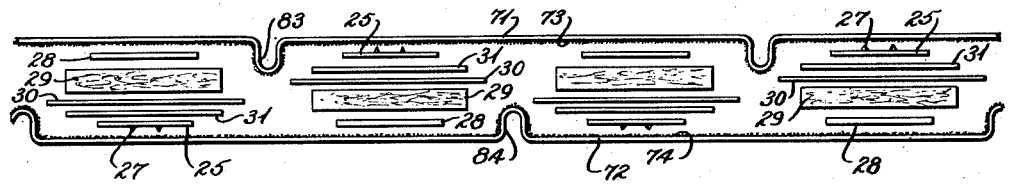
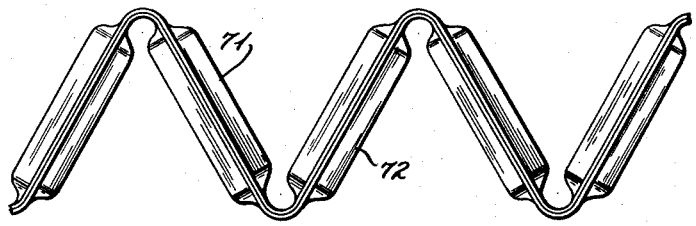
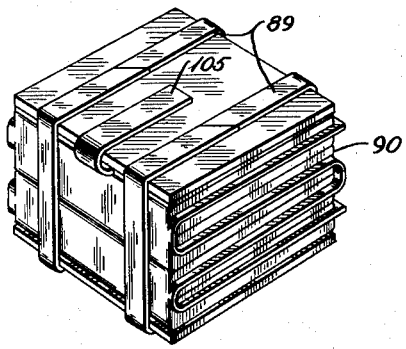
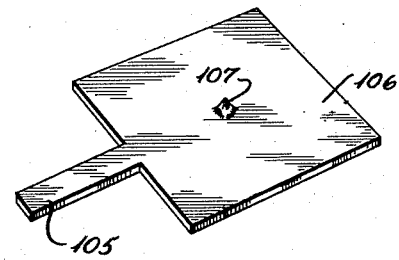
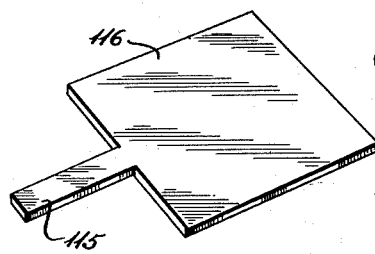

INVENTOR
Glenn J. Nowotny
BY Beale and Jones
ATTORNEYS

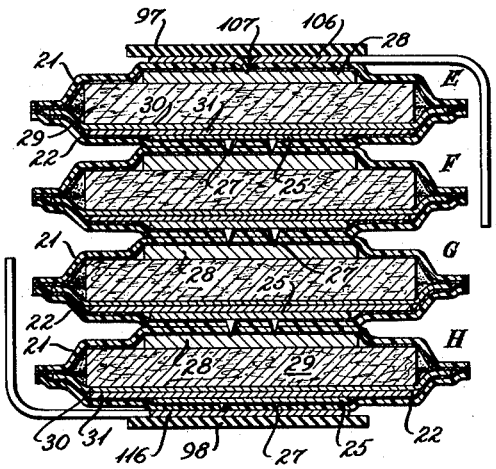
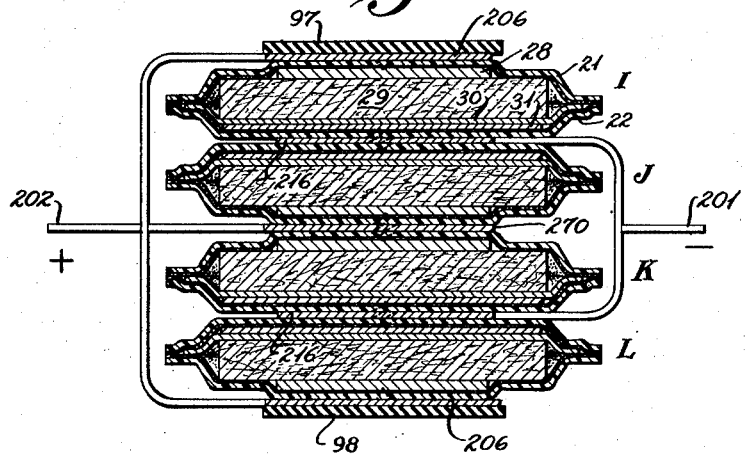

United States Patent Office 2,798,895
Patented July 9, 1957

2,798,895

POINT CONTACT BATTERY

Glenn J. Nowotny, Madison, Wis., assignor to Ray-O-Vac Company, Madison, Wis., a corporation of Wisconsin Application June 18, 1954, Serial No. 437,645

1 Claim. (Cl. 136—111)

This invention is an improvement of the dry cell and battery structure described in the copending application, Serial No. 294,366, filed June 19, 1952, now U. S. Patent No. 2,745,894, of Glenn J. Nowotny, entitled "Primary Dry Cell."

This invention relates to an improved dry cell and to an improved battery made therefrom. More particularly, this invention relates to dry cells of the flat type in which the elements of the cells are in the form of flat sheets or plates and the individual cells are in the form of flat wafers. With further particularity, this invention relates to a unit dry cell in which each unit is a complete cell within itself, and in which the cell components are sealed within a pair of plastic sheets which are bonded together around the entire periphery of each sheet.

In the copending application of Glenn J. Nowotny, Serial No. 294,366, now U. S. Patent No. 2,745,894, referred to above, there is described a dry cell in the form of a flat wafer in which the positive electrode of the cell comprises a sheet of conductive plastic which is positioned within the cell wafer in such a manner as to form a fully closed interior pocket with the nonconductive plastic forming the exterior envelope of the cell. Within this fully closed interior pocket there is positioned a metal collector plate which functions to give the cell a desired structural rigidity and also to decrease the internal resistance of the cell. Electrical contact with the interior of the cell may be made by projecting a sharp, pointed conducting instrument through the envelope enclosing the cell to make contact with the collector plate or with the sheet metal negative electrode. In one form of the invention described in that application, the collector plate is provided with a number of sharp projecting surfaces which, under pressure, break through the envelope enclosing the cell and make contact with an exterior collector plate or with an adjacent cell. In the cell structure described in that application, each complete cell comprises an outer envelope enclosing the active components of the cell, which in each case include the flexible, plastic positive electrode and its collector plate. The cell structure also includes some means for puncturing the envelope in order to make electrical contact between the cell interior and the cell exterior.

The object of the present invention is to improve upon the cell described in the Nowotny application, Serial No. 294,366, now U. S. Patent No. 2,745,894, by simplifying cell structure and eliminating some of the components in that structure, thereby facilitating the manufacturing processes involved in making these cells.

A further object of the present invention is to provide an improved dry cell structure in which the cell elements are completely enclosed within a flexible, non-conductive plastic envelope.

Another object of the invention is to provide individual dry cells of the flat, or wafer, type, which may be individually fabricated and stored as such with long shelf life and which may be individually tested in a convenient, economical and rapid manner prior to their assembly into a battery of dry cells.

Other objects of the invention disclosed in the present application will become apparent from the broad and detailed descriptions and specific examples given hereinafter. It should be understood, however, that the detailed description and specific examples are given by way of illustration only, and while indicating preferred embodiments of the invention, are not given by way of limitation, since various changes and modifications in the spirit and scope of the invention will become apparent to those skilled in the art from this detailed description.

Broadly, the above objects are accomplished by providing an envelope of nonconductive, flexible plastic material, the interior surface of which may be and preferably is coated with a suitable adhesive over its entire, or over a portion of its area, said envelope enclosing the active components of the cell which include a substantially flat, relatively rigid, metal plate functioning as the negative electrode, a bibulous, electrolyte-containing substance superposed upon the negative electrode, a mix cake containing depolarizing material and electrolyte resting on the bibulous layer, and a positive electrode comprising a substantially flat, relatively rigid sheet or disc of material. In the preferred embodiment of the invention, the negative electrode is a piece of zinc sheet and the positive electrode is a carbon button or disc, or a rectangular sheet of carbon or carbon particles which have been compressed into a relatively rigid form.

For a more complete understanding of the nature and scope of the present invention, reference may be made to the following detailed description taken in connection with the accompanying drawings, in which:

Fig. 1 is an expanded view, in perspective, of the unassembled elements of the cell;

Fig. 2 is a side elevation, in cross section, in detail, showing an assembled, complete cell unit;

Fig. 3 is a side elevation, in partial cross section, showing the manner of making contact between a plurality of adjacent cells;

Fig. 4 is a side elevation of a modified form of the invention;

Fig. 5 is a perspective view of a point contact plate suitable for use in the preferred form of the invention illustrated in Fig. 1;

Fig. 6 is a perspective view of a point contact plate suitable for use in the modified form of the invention illustrated in Fig. 4;

Fig. 7 is an expanded view in cross section of a modification of the invention in which the outer envelopes of a series of cells are formed from a pair of continuous strips of plastic material;

Fig. 8 is a side elevational view of a plurality of cells formed as illustrated in Fig. 7, with the cells being partially folded over as they would appear at an intermediate stage in arranging a stack of superimposed cells;

Fig. 9 is a perspective view of a battery formed of the cell units which have been prepared in accordance with Figs. 7 and 8 of the drawings and wherein the cells are arranged in series connection;

Fig. 10 is a perspective view of an element adapted for use as one of the end terminals of a battery such as that illustrated in Fig. 9 of the drawings;

Fig. 11 is a perspective view of another terminal element adapted for use in the battery illustrated in Fig. 3 of the drawings;

Fig. 19 is a side elevation, in cross section, of a battery formed of the cell units shown in Fig. 2, wherein the cells are arranged in series electrical contact;

Fig. 20 is a side elevation, in cross section, of a battery formed of the cell units shown in Fig. 4, wherein the cells are arranged in parallel electrical contact.

Figure 12:
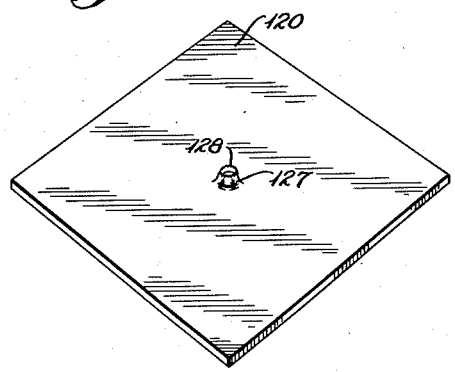
Fig. 12 is a perspective view of a modification of a metal point contact plate differing from that illustrated in Figs. 5 and 6.

Referring now to the drawings, wherein like reference numerals refer to similar elements, the cell elements utilized in assembling an illustrative form of cell embodying the principles of this invention are shown in Fig. 1 of the drawings. The external components of the envelope, 21 and 22, are formed of a non-conductive, moisture-resistant, plastic film, preferably heat-sealable, such as the rubber hydrochloride film sold under the trademark "Pliofilm." The inner, facing, surfaces of sheets 21 and 22 are at least partially coated with a suitable adhesive, 23 and 24. A metallic point contact plate 25, which by way of illustration is shown as circular in shape, with a plurality of sharp pointed projections raised from its central area, is adapted to be placed upon the adhesive surface 24 of the plastic sheet 22, with the sharp projections 27 pointed toward, and adapted to be embedded in, the adhesive 24. Over the conductive point contact plate 25 is a sheet metal plate 31, which functions as the negative electrode of the cell. In the preferred embodiment of the invention, the sheet metal plate 31 is made of zinc. The negative electrode 31 is preferably larger in all dimensions than the point contact plate 25, and in effect, in combination with the plastic outer envelope 22, forms a closed pocket within the cell within which the point contact plate 25 is completely enclosed. Any suitable sheet of bibulous material 30, adapted to carry an appropriate amount of electrolyte, is disposed over the negative electrode 31. This electrolyte carrier 30 is preferably larger in all its dimensions than the negative electrode 31, in order to interpose between the negative electrode and the other cell-components, a conductive layer of electrolyte, and so as to prevent local action and short circuits within the cell. The electrolyte carrier may be bibulous paper, starch paper, a fabric such as the fabric sold under the trademark "Webril," or any suitable medium for absorbing and retaining the electrolyte solution. Fabric sold under the trademark, "Webril," is an alkali-resistant matted fabric made by combining cotton and rayon fibers with thermoplastic fibers.

A mix cake 29 of conventional depolarizer material mixed with graphite for added conductivity may be placed upon the bibulous electrolyte carrier 30. Superimposed upon the mix cake 29 is a positive electrode 28, which for purposes of illustration is shown here as a circular button.

The positive electrode 28, in a preferred embodiment of the invention, is a button formed of particles or granules of carbon which have been compressed into a relatively rigid cylindrical form having substantial strength. The positive electrode 28 is disposed upon the adhesive surface 23 of the plastic sheet 21. When the cell components have been positioned as described above, the edges of the plastic sheets 21 and 22 are bonded together by compressing the adhesive layers 23 and 24 around their entire margins, as illustrated in Fig. 2, and as further illustrated in Fig. 3.

When a cell has been assembled and edge-sealed as described above, the cell will appear in cross section as shown in Fig. 2 of the drawings. While the cell elements, discussed above and illustrated in Figs. 1 and 2 of the drawings, have been shown as having particular physical outlines, it will be readily understood that other configurations may be employed. Thus, the cell components may be circular, oval, triangular, polyangular, oblong or unsymmetrical in outline, if desired. However, the configurations described above and illustrated in Figs. 1 and 2 are those found in a preferred embodiment of the invention.

When it is desired to assemble two or more cells to form a battery of any desired voltage, the cell units may be placed one on top of another in the form of a stack and the stack subjected to compression. Under such compression, the sharp projections 27 on the metal contact plates 25 pierce through and puncture the plastic sheet 22, not only of the cell enclosing the metal plate 25, but also the plastic sheet 21 of the cell just adjacent it, as shown in Fig. 3. The projections 27 make electrical contact with the positive electrode 28 of the adjacent cell and provide for the necessary cell-to-cell electrical conductivity.

As will be observed from Fig. 3 of the drawings, the projecting points 27 penetrate through the adhesive coatings in penetrating through the two sheets of plastic, and while the plastic sheets 21 and 22 are punctured, the punctures are self-sealed by the adhesive of layers 23 and 24, thus effectively preventing the escape of electrolyte from within either cell. In addition, the negative electrode 31 forms an enclosed pocket within the cell in combination with the plastic envelope 22. Within this pocket, the point contact plate 25 is completely enclosed. This pocket also assists in sealing the cell and in preventing any electrolyte from escaping from the cell through the punctured area formed by the projections 27 on the point contact plate 25.

It will thus be apparent that a plurality of cells may be stacked together and assembled in a battery wherein each cell is in electrically conductive relationship with regard to the adjacent cells, but wherein each cell is a completely sealed and completely enveloped unit. While the above description refers to a preferred embodiment of the invention, the same result may be achieved by a somewhat modified form of cell. In the modification illustrated in Fig. 4, the point contact plate has been omitted from the individual cells. This type of cell construction has the advantage that accidental pressures placed upon the cell will not pierce the cell envelope, since there are no pointed projections within the cell. This is an additional safeguard against possible evaporation and leakage from the cell, and assists in keeping the cell at full strength while in storage and until ready for use.

In the modification illustrated in Fig. 4, when it is desired to assemble a plurality of cells into series electrical contact, the electrical contact between cells is achieved by employing a point contact plate 45 which has projections 47 pointed in opposite directions from the plane of the plate 45. The projections on one side of the point contact plate will make contact with the negative electrode plate 31 of one cell, while the projections on the opposite side of the point contact plate will provide electrical contact with the positive electrode 28 of the adjacent cell. In this manner, electrical contact between each of the cells in a stack may be accomplished at the time the cells are made up into a battery stack ready for use.

The two types of point contact plates described above are shown in somewhat enlarged perspective views in Figs. 5 and 6. It should be understood that these plates may take any geometrical configuration desired, and that the circular shape shown has been chosen for purposes of illustration only.

In the several forms of cells described above, the cells have been individually formed by the edge-sealing of a pair of generally square sheets of plastic. Under some circumstances, it may be desired to form a plurality of cells by assembling the cell components between relatively elongated strips of plastic. An illustrative manner of assembling two or more cells between such elongated strips of plastic is shown in Figs. 7, 8 and 9 of the drawings.

With reference to Fig. 7, a rather long strip of plastic 71 having its inner surface covered at least partially with an adhesive 73, is placed opposite to a similar long strip of plastic 72, likewise having its inner surface covered at least partially with a suitable adhesive layer 74. The point contact plates 25, negative electrodes 31, electrolyte carriers 30, mix cakes 29, and positive electrodes 28 may be arranged in the manner described above with relation to Figure 1 of the drawings. However, these elements are reversed from top to bottom with respect to every other cell as fully shown in Fig. 7 of the drawings. Between each pair of cells a certain amount of surplus plastic sheet sufficient to provide a recessed bend 83 or 84, and to provide sufficient material for edge-sealing between each two cells, is supplied. When the cell components have been arranged to provide for the desired number of cells between the plastic strips 71 and 72, the cells are each placed under compression and the envelopes are completely sealed around the entire periphery of each cell unit. Sufficient excess material is provided between each cell unit to provide for not only the transverse edge-sealing, but folding of the sealed edges between each two adjacent cells. The strips of cells so sealed may then be folded accordion-wise, as shown successively in Figs. 8 and 9, to form a stack of cells. The stack of cells may then be provided with a suitable terminal plate or plates, and binding means, as shown for example in Fig. 9 of the drawings.

A simple form of binding means for the battery pack 90 illustrated in Fig. 9, may be provided by a pair of simple straps 89. Since the individual cells have been arranged in alternating fashion, as shown in Fig. 7, the sharp projecting points of one point contact plate will project from the stack at one end of the pack. At the other end of the pack, there will be no projections because this end of the pack will be the positive electrode end. In the preferred form of the invention, the positive electrode will be a carbon button. In order to make satisfactory electrical contact with the battery pack 90, a terminal plate 106, as illustrated in Fig. 10, may be employed, at the positive end of the battery. A projection or a group of projections 107 on the contact plate 106 may be employed to pierce the plastic envelope 71 and make contact with the positive electrode 28. At the negative end of the battery pack, where the sharp projections 27 on the contact plate 25 protrude through the plastic envelope 72, a contact plate 116 such as is illustrated in Fig. 11, may be employed. A connecting tab 105 on contact plate 106 may be employed to provide for convenient electrical connections to the positive terminal, while a tab 115 on the connecting plate 116 may be employed to provide convenient electrical connections with the negative end of the battery.

Figure 13:
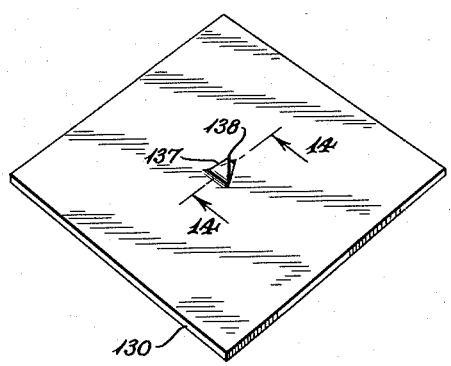
Fig. 13 is a perspective view of a modification of the metal point contact plate.
Figure 14:
Fig. 14 is a fragmentary side elevation in cross section, taken along line 14—14 of Fig. 13.
Figure 15:
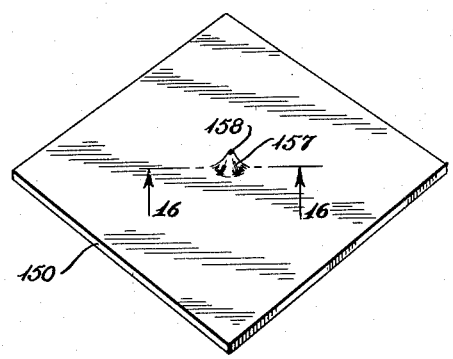
Fig. 15 is a perspective view of the modification of the metal point contact plate.
Figure 16:
Fig. 16 is a fragmentary side elevation in cross section, taken along line 16—16 of Fig. 15.

In Figs. 1, 5 and 6 there have been shown, in illustrative form, circular, metallic connector plates. Other forms may be employed, and Figs. 12 through 18 show other modifications. In Fig. 12, the rectangular collector plate 120 there illustrated has an up-struck cone 127 terminating in a puncturing annulus 128. This form of collector plate is relatively simple and may be fabricated by driving a pointed object such as a nail through the plate. In Figs. 13 and 14 the collector plate 130 has an up-struck V 137, terminating in a puncturing point 138. In Figures 15 and 16 the collector plate 150 is provided with an elevated contact area 157, terminating in a relatively sharp point 158. This form of contact area may be formed by striking the contact plate 150 with a pointed object with sufficient force to deform the plate but not to puncture it.

Figure 17:
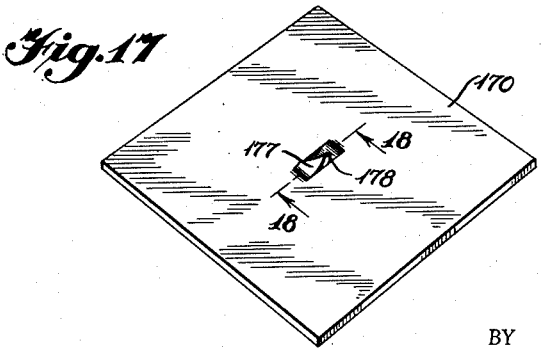
Fig. 17 is a perspective view of a modification of battery contact or terminal adapted for use with one embodiment of the dry cell.
Figure 18:
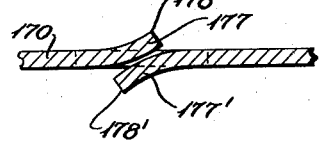
Fig. 18 is an end view of the battery contact or terminal shown in Fig. 17.

In Figures 12 through 18, the point contact plates are shown in exaggerated size in order to illustrate more clearly the relatively small contact points. In the preferred forms of the invention, the point contact plates will be small in size as compared to the negative electrode on which they rest. It is to be understood, however, that these plates may be of any size which is found convenient in assembling the cells. As a practical matter, the contact plate should not be of larger size than the negative electrode, in order to provide for the best and strongest cell assembly.

Where it is desired to provide a point contact plate which is to be used independently of the cell structure, such as the contact plate 45 illustrated in Fig. 6, various modifications such as those illustrated in Figs. 17 and 18 may be employed. In Figs. 17 and 18, the contact plate 170 is provided with an up-struck V portion projecting from each surface. Each projecting V 177 and 177' has a sharp terminal point 178 and 178', respectively.

Although in many cases it is convenient to fabricate a battery pack from a group of cells made within plastic strips of considerable length, as illustrated in Figs. 7, 8, and 9, under some circumstances it may be desirable to form a battery pack from a group of individual cells of the type illustrated in Figs. 1, 2 and 3. Such a battery pack is illustrated in Fig. 19. In this modification of the invention, a group of cells E, F, G, and H are superposed to provide a series-connected battery of 6 volts. It will be readily understood that any number of individual cells may be employed to provide a battery of any desired voltage, and the battery of six volts has been selected for illustrative purposes only. Each cell makes contact with its adjacent cell, when compression is applied through the projecting points 27 of its contact plate 25. In order to make electrical contact with the positive electrode of the uppermost cell E, a contact plate 106 such as that illustrated in Figure 10 is employed. This contact plate is provided with a projection 107 which pierces the plastic envelope 21 of cell E to make electrical contact with the positive electrode 28 of the cell. For convenience in handling, the connecting plate 106 may be covered with a layer 97 of a non-conductive plastic material such as "Pliofilm," before being placed under compression. Similarly, a contact plate 116, such as is shown in Fig. 11, may be employed to make electrical contact with the negative electrode of the lowermost cell H, through the projection points 27 of the contact plate 25.

A dielectric layer 98 may also be provided to cover the contact plate 116. The entire cell may then be placed under compression for convenience in handling and usage by a pair of straps (not shown).

The cells illustrated in Fig. 4 may be employed to provide "A" batteries by stacking a plurality of cells arranged in the desired order of polarity as shown in Fig. 20. In this figure, four cells, I, J, K, and L have been stacked in such a manner that the negative electrodes of cells I and J are juxtaposed, and the negative electrodes of cells K and L are juxtaposed. Two-way contact members 216 similar to those illustrated in Figures 17 and 18 may be inserted between each pair of juxtaposed cells. The two-way contact members between cells I and J and K and L are then joined to provide a suitable negative battery terminal 201. One-way collector plates are employed to make contact with the outermost electrodes of cells I and L, respectively. These one-way plates, 206 are then electrically connected with the two-way plate 270 which was inserted between cells J and K, and all three are electrically connected to a suitable positive battery terminal 202. If desired, the end plates 206 of this cell may also be covered with suitable insulating sheets 97 and 98 before being compressed for use.

Several modifications of the invention, not specifically illustrated in the drawings, will be readily apparent to those skilled in the art. For example, it would be possible to modify the structure illustrated in Figure 7 so that the cells were in parallel arrangement, and by the use of suitable collector plates, an "A" battery of any desired size could be fabricated.

The individual cells and the batteries described above by way of illustration have certain characteristics, common to all forms thereof. Each unit cell is completely sealed around its entire marginal periphery. When the cell elements have been placed in position and the insulating envelope sealed around the cell elements, the cell has no protruding terminal members between the edges of the envelope or positioned at any other part of the envelope. Generally speaking, the sharp points on the collector plate do not pierce the plastic envelope until some compression is applied to the cell. However, even if there is some slight compression applied to the cell through accidental dropping or through rough handling of the cell, there is no electrolyte leakage or evaporation through the pierced plastic envelope because of the self-sealing characteristics of the adhesive-coated film and because the contact plate is sealed off from the electrolyte-containing space within the cell by a pocket formed by the negative electrode and the adhesive-coated plastic.

In the form of cell illustrated in Figure 4 there is no danger of puncturing the non-conductive plastic envelope during fabrication, handling, or storage of the cells since the contact plate is not included within the cell structure. In fact there is no danger of penetration into the cell until the cells are stacked and subjected to compression in the presence of externally applied contact plates 45 of the type illustrated in Figure 4. As a general proposition relative to all embodiments of the present invention, it is only after a cell has been subjected to some compression so as to puncture the envelope by means of the puncturing contact points, that the cell is capable of making contact with another cell.

The advantages discussed above are true also of the cell structure described in the copending application of Glenn J. Nowotny, Serial No. 294,366, for a "Primary Dry Cell." The present structure has the further advantage of greater simplicity of structure, in that the positive electrode is formed of a single item such as a carbon button, or any other non-chemically active conductor suitable for use as a positive electrode. The simplicity in structure facilitates the manufacturing processes and decreases the size of the unit cell necessary for a given capacity. Consequently, the use of unit cells described in the present application provides for batteries of desired capacity which are of smaller volume and lesser weight than has heretofore been possible.

It is to be understood that various forms of penetrating points or edges may be used on or in connection with the contact plates such as the plate 25 illustrated in Figure 1, but the upturned corners with sharp edges illustrated in Figures 1, 5, 6, 13, 14, 17 and 18 of the drawings are the preferred forms. The angularity of the upturned edge or point is preferably about 45 degrees from the plane of the metal contact plate. While this angularity is not critical, it is important because it permits the corners to flex somewhat when a stack of cells is placed under compression, and the result of such flexing is to give each corner a bite into the electrode in the adjacent cell. This "bite" has a tendency to cause an increase in electrical conductivity between cells. While the upturned angle just described is the preferred embodiment of contact point for the contact plate, it is to be understood that other means of providing contact points may be incorporated in the contact plates, the essential requirement being that the points or edges are long enough and sharp enough to penetrate through the adjacent layer of the plastic of its own cell and the adjacent layer of the plastic in a juxtaposed cell to provide contact between juxtaposed cells.

Reference has been made above to coating the interior faces of the enveloping sheet or sheets of plastic with a suitable adhesive. There may be considerable variation in the use of such adhesive coating and in places and proportions of the non-conductive surface to which it may be applied. In some instances, the adhesive coatings may be applied to the entire inner surfaces of both sheets of plastic, as illustrated in Figure 1 of the drawings. Alternatively, adhesive may be applied only to the marginal edges of the plastic, or adhesive may be applied only to the central area of the plastic, with heat-sealing being utilized along the marginal edges of the envelope. It is within the scope of this invention to omit the adhesive coating from any portion of the envelope and to utilize heat-sealing entirely.

In a preferred embodiment of the invention the cell is of the Leclanché type. In this embodiment of the invention, the electrolyte carrier 30 may be of starch paper and in such a cell will be impregnated or saturated with an ammonium chloride-zinc chloride electrolyte solution. In such a cell the negative electrode 31 may desirably be a sheet of zinc. It should be understood, however, that the electrode 31 may be any suitable base of a supporting material containing accessible zinc, or may, if desired, be zinc foil or compressed zinc powder. Sheet zinc is desirable since it provides structural rigidity for the cell, but where this is not an important consideration in the cell structure, the types of negative electrodes suggested above may be employed. The mix cake is preferably a mixture of manganese dioxide with a suitable form of conductive carbon or graphite.

The present cell, however, is not limited to cells of the Leclanché type. With slight modification and adjustment of materials, the present forms of cells and batteries may be used with other primary cell systems. For use with alkaline electrolytes, it is preferred to replace the "Pliofilm" or similar plastic sheeting with an enveloping plastic which is somewhat more resistant to the alkaline electrolyte. A polyethylene sheet is satisfactory for this purpose. Where the word "Pliofilm" is employed in this disclosure, it is to be understood that the word refers to sheets of chlorinated rubber which are sold under this name. This particular type of non-conductive plastic has the advantages of being tough, resilient, tear-resistant, and substantially impervious to both moisture and most gases, although it is capable of venting hydrogen by diffusion. It has the advantage of being resistant to the electrolyte used in the Leclanché cell. It is heat-sealable by fusion and is readily bonded together by means of suitable adhesives. In lieu of "Pliofilm," however, polyvinyl and polyethylene films may be used, as well as other types of plastic sheet materials which have similar desirable characteristics.

It will be understood from the foregoing descriptions of illustrative embodiments of the dry cells, batteries formed therefrom, and component parts thereof, that considerable variation may be made within the scope of this invention. It should be understood that various changes may be made, as by substituting illustrative embodiments shown in one or more of the figures for equivalent embodiments or elements disclosed in other figures of the drawings. The invention should not be limited beyond the scope of the claim.

I claim:

In a primary dry cell confined within completely sealed envelope of a flexible, non-conductive sheet plastic and having a positive electrode, an electrolyte, a negative electrode, and a metal collector plate, said electrodes being substantially flat and relatively rigid, said collector plate having at least one protruding sharp surface disposed against an inside surface of said sealed envelope and adapted for puncturing said sealed envelope, the improvement which comprises one surface of said flat negative electrode and one surface of said collector plate being in juxtaposition with respect to each other, said juxtapositioned surface of the collector plate having a smaller surface area than that of said juxtapositioned surface of the negative electrode to provide a substantial remaining area on said surface of the negative electrode around the peripheral edge of said collector plate, said remaining area being sealed to said inside surface of the plastic envelope.

References Cited in the file of this patent

UNITED STATES PATENTS

| | | |
|---|---|---|
| 1,706,005 | Thompson | Mar. 19, 1929 |
| 2,307,764 | Deibel et al. | Jan. 12, 1943 |
| 2,436,382 | Deibel et al. | Feb. 24, 1948 |
| 2,463,089 | Deibel | Mar. 1, 1949 |
| 2,534,881 | Schroeder | Dec. 19, 1950 |
| 2,635,128 | Arbogast | Apr. 14, 1953 |